United States Patent [19]

Windham

[11] 4,375,386
[45] Mar. 1, 1983

[54] CYCLONIC ENTRAINMENT SEPARATOR FOR EVAPORATOR

[75] Inventor: Donald M. Windham, Lakeland, Fla.

[73] Assignee: The Badger Company, Inc., Cambridge, Mass.

[21] Appl. No.: 261,485

[22] Filed: May 7, 1981

[51] Int. Cl.³ .............................................. B01D 1/00
[52] U.S. Cl. ..................................... 159/31; 202/197; 55/339; 55/399; 55/457
[58] Field of Search .......................... 159/31; 202/197; 55/399, 457, 447, 399

[56] References Cited

U.S. PATENT DOCUMENTS

| 1,522,903 | 1/1925 | Pabodie | 55/457 |
| 2,229,860 | 1/1941 | McCurdy | 55/399 |
| 2,510,548 | 6/1950 | Brunjes | 159/31 |
| 3,670,480 | 6/1972 | Petersen | 55/457 |

Primary Examiner—Norman Yudkoff
Attorney, Agent, or Firm—Schiller & Pandiscio

[57] ABSTRACT

A vacuum evaporator is provided with an integral cyclonic-type entrainment separator at the top of the evaporator vapor body which comprises a helical spin plate for imparting a centrifugal action to the vapor and entrained liquid rising from the boiling liquid in the flash chamber. Liquid entrainment is deposited on the vertical wall of the evaporator and flows downward countercurrent to vapor flow into a collecting trough, from which it is discharged into a pipe that returns it to the boiling liquid.

24 Claims, 7 Drawing Figures

CYCLONIC ENTRAINMENT SEPARATOR FOR EVAPORATOR

BACKGROUND OF THE INVENTION

This invention relates to apparatus for separating liquid from gas and more particularly to provision in a flash evaporator of a separator for removing entrained liquid from vapors arising from a body of boiling liquid in the flash chamber of the evaporator.

PRIOR ART

It is necessary in industry to evaporate liquids, for one purpose or another, e.g., for concentrating chemical solutions or separating and recovering a selected component by vaporization and condensation. This is commonly done in evaporators characterized by flashing chambers which are under a reduced pressure, as a consequence of which vapor is formed by flash evaporation. As generally used in concentrating chemical solutions, e.g., aqueous solutions of phosphoric acid or sodium hydroxide, such evaporators have the disadvantage that a certain proportion of the liquid chemical is entrained in the vapor arising from the boiling liquid, with a consequent loss of chemical content unless the entrained liquid is separated from the vapor before it is discharged from the evaporator. Consequently a number of different types of separators have been incorporated in evaporators to effect separation of entrained liquid (and also entrained solids). Such separators have taken various forms and have utilized, for example, cyclonic action and baffling to achieve separation and collection of entrained material. The prior art of evaporators equipped with separators for entrained liquids is exemplified by U.S. Pat. Nos. 567,895, 940,473, 989,996, 1,853,739, 2,103,521, 2,172,236, 2,970,671 and 3,614,858. Prior known separator designs have not been satisfactory for many applications. Among the problems that have been encountered with entrainment separators mounted on top of evaporator flash chambers are high maintenance costs and inefficiency of separation due to excessive pressure drops associated with vapor piping. Such problems have been incurred, for example, in connection with evaporators used to concentrate phosphoric acid.

SUMMARY OF THE INVENTION

The object of this invention is to provide an entrainment separator for a vacuum evaporator which is efficient and reliable and in particular is arranged so as to reduce the amount of vapor piping connecting the vapor outlet of the separator to the vacuum source of the evaporator.

A further object is to provide an entrainment separator which is integral with the evaporator and is disposed in the upper end of the evaporator vessel in a manner which permits more effective utilization of pressure drops for entrainment separation.

Another more particular object is to provide an evaporator with an entrained liquid separator that is especially suitable for use in a phoshoric acid plant for concentrating the product acid.

These and other objects are achieved by incorporating in the upper section of an evaporator a separator which comprises a helical spin plate surrounding a center pipe. The vapors rising from the liquid in the flash chamber experience a centrifugal action as they flow upward in a helical path over the spin plate around the center pipe. The vapors reverse direction at the upper end of the separator and flow downward through the center pipe which is elbowed and extends out through the wall of the flash chamber so as to serve as the vapor outlet. "Catchers" are provided in the separator to trap any entrainment which is deposited on and travels up the spin plate or the inner wall of the vessel. A trough is provided at the outer periphery of the spin plate to recover the separated entrainment and return it by external piping or a dipleg to the evaporator system.

Other features and advantages are set forth in or rendered obvious by the accompanying drawings and the following detailed description.

THE DRAWINGS

The invention is described hereinafter in greater detail with reference to the accompanying drawings in which.

DESCRIPTION OF THE PREFERRED EMBODIMENT

Figure 1:
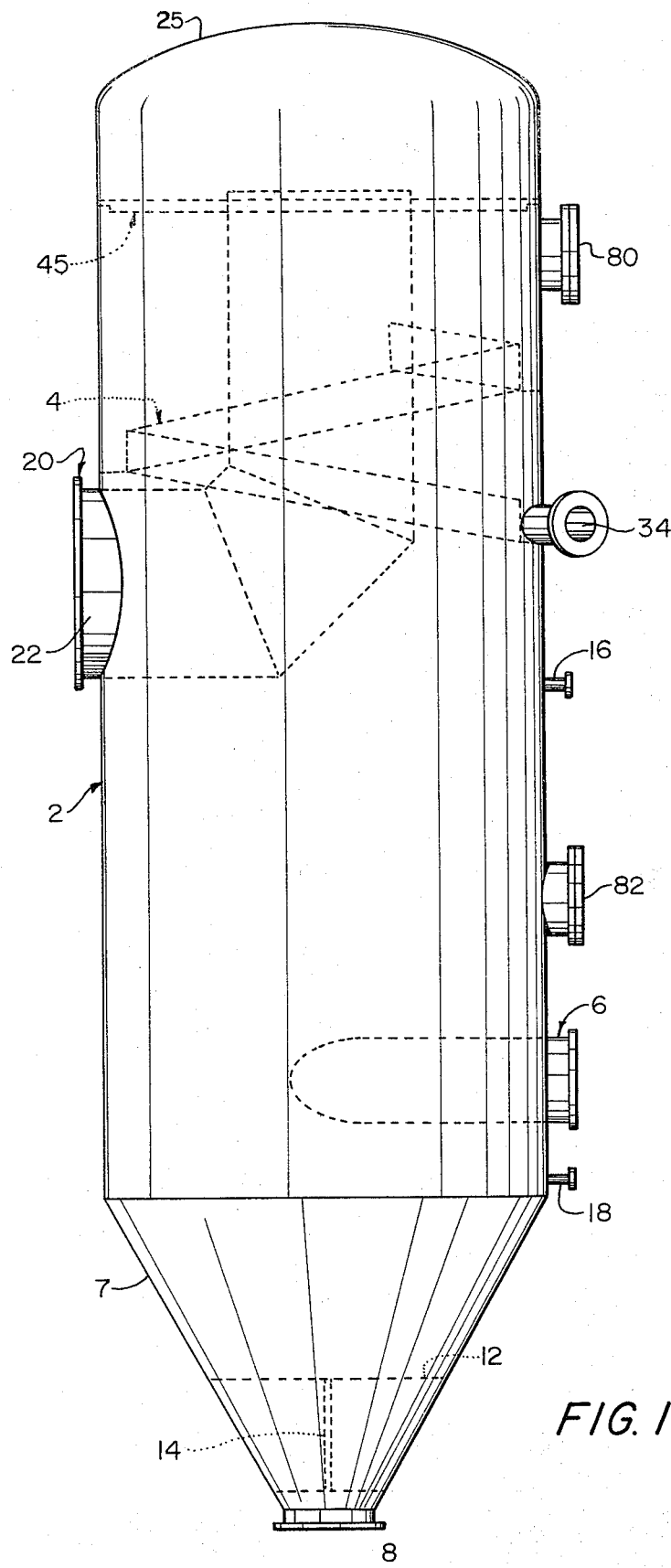
FIG. 1 is a side elevation of an evaporator vessel embodying an entrainment separator made in accordance with this invention.
Figure 2:
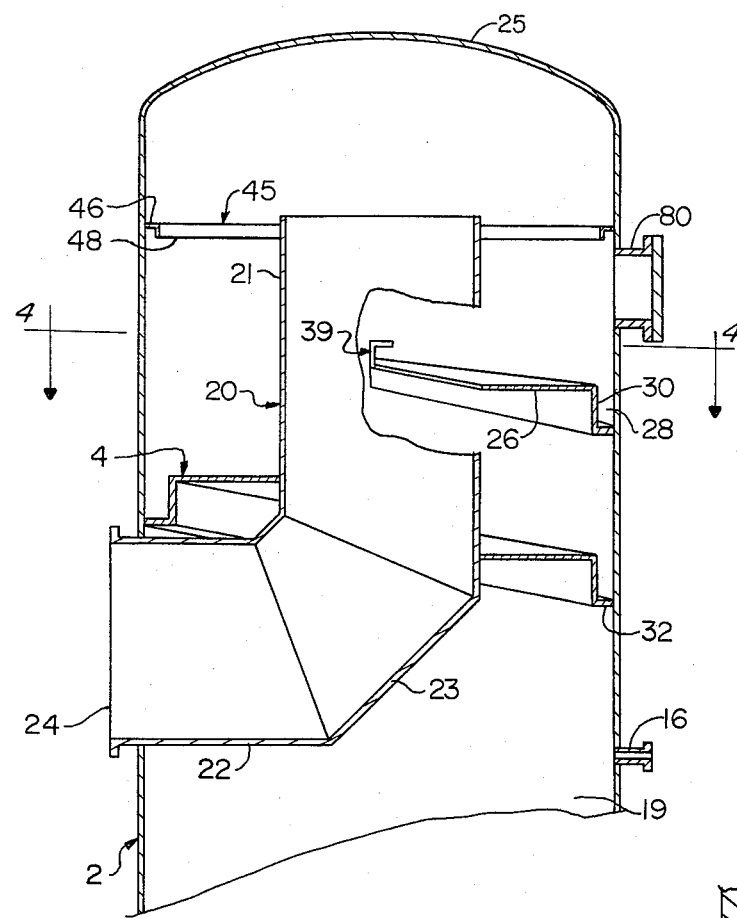
FIG. 2 is a fragmentary longitudinal sectional view of the same vessel showing details of the entrainment separator.
Figure 6:
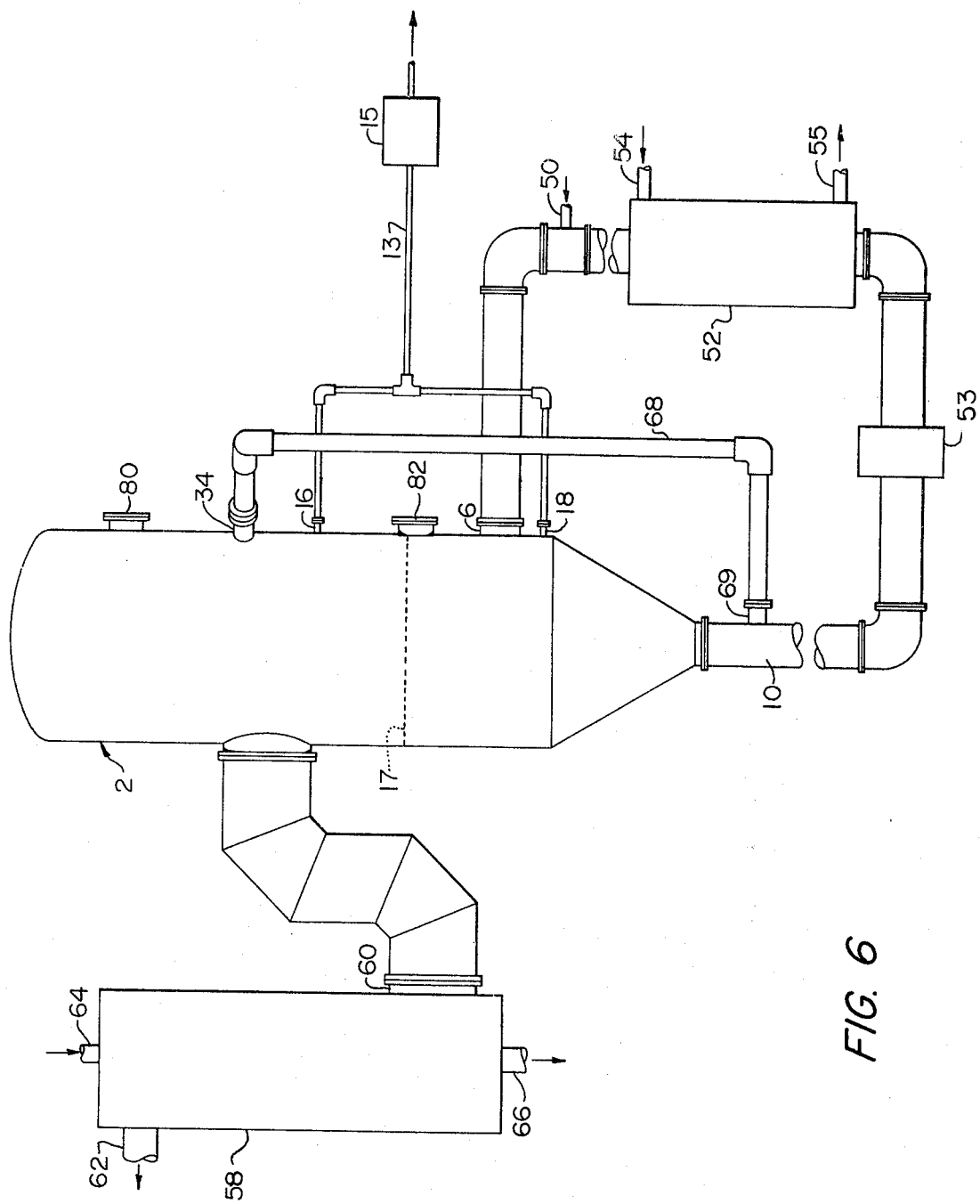
FIG. 6 illustrates how the evaporator of FIGS. 1 and 2 is embodied in a system for concentrating a solution, e.g., phosphoric acid.

FIGS. 1 and 2 show an evaporating unit which comprises a vessel 2 and has in its upper portion an apparatus identified generally by the numeral 4 for separating entrained liquid from a gas such as water vapor. Vessel 2 is closed at its top end and has an inlet pipe 6 arranged so as to introduce liquid feed tangentially of the vessel's inner surface. The bottom end of vessel 2 is tapered as shown at 7 and has an outlet 8 adapted to be connected to a downleg pipe 10 (FIG. 6). Preferably but not necessarily, two diametrically extending intersecting plates 12 and 14 are fixed in the vessel adjacent bottom outlet 8 for the purpose of preventing any vortex-like action of liquid in the bottom of the vessel. Two side outlets 16 and 18 are provided above and below inlet pipe 6. Side outlet 16 is intended to serve as an overflow vent and is located above the desired level 17 of boiling liquid in the vessel, while side outlet 18 is located below liquid level 17 and is intended to serve as an overflow connection as hereinafter described. As shown in FIG. 6, side outlets 16 and 18 are connected to a line 13 which leads either to a product storage tank (not shown) if vessel 2 is the sole or last evaporator stage or to the next evaporator stage if the evaporator system has more than one evaporation stage and vessel 2 is not the last stage. The level of the junction of line 13 with the lines leading to outlets 16 and 18 determines the liquid level 17 in vessel 2. A pump 15 may be provided in line 13 for facilitating transfer of concentrated liquid product to storage or another evaporator stage.

Located in flashing chamber 19 above the normal liquid level 17 is a center pipe 20. The latter comprises a vertical upper section 21 whose open top end is located below the upper end wall 25 of vessel 2 and serves as a vapor intake, and a horizontal section 22 which is connected by an elbow connection 23 with vertical section 21 and has an open outer end 24 which extends through the side wall of vessel 2 and serves as a vapor outlet.

Figure 3:
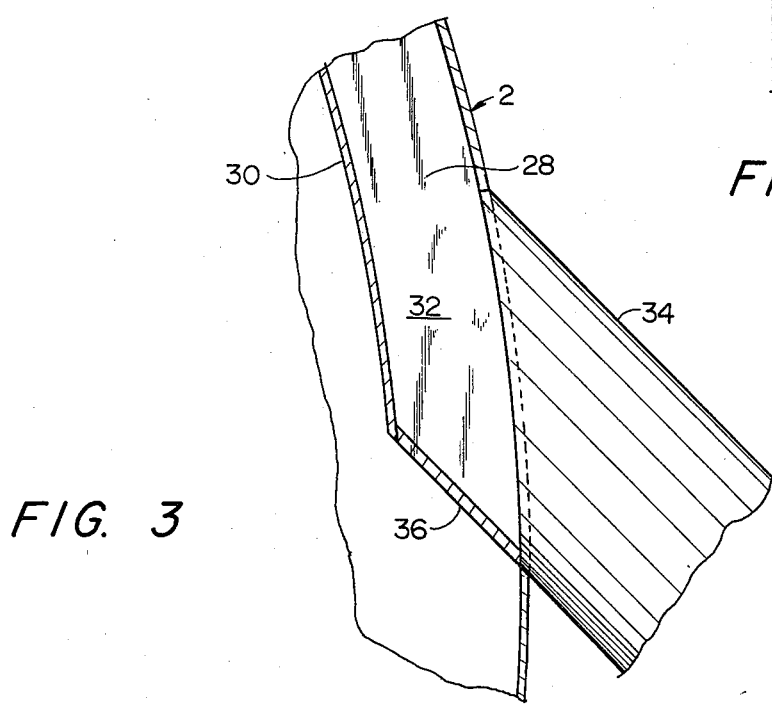
FIG. 3 is an enlarged fragmentary cross-sectional view illustrating the drain connection for the trough.

Entrainment separator 4 is located between, and its side boundaries are defined by, the vertical section 21 of center pipe 20 and the inner surface of vessel 2. Separator 4 comprises a helical spin plate 26 and a helical trough 28 defined by a helical side wall 30 and a helical bottom wall 32. As viewed in cross-section, plate 26 and wall 32 preferably extends horizontally, i.e., at a right angle to the longitudinal axis of vessel 2 and the vertical section 21 of center pipe 20, while side wall 30 preferably extends vertically, i.e., parallel to the longitudinal axis of vessel 2. However, it is contemplated that plate 26 could be arranged so that, as viewed in cross-section, it is inclined relative to the center pipe, whereby gravity will cause liquid on the plate to move away from the center pipe toward side wall 30. Additionally, it is contemplated that side wall 30 could be arranged so that, as viewed in cross-section, it is inclined relative to the center pipe, whereby the cross-sectional shape of trough 28 would be trapezoidal rather than rectangular or square. In any event, the spin plate is secured to pipe 20 and side wall 30, while bottom wall 32 is secured to side wall 30 and the side wall of vessel 2, with the result that the entrainment separator structure is integral with the evaporator vessel. Spin plate 26, side wall 30 and bottom wall 32 extend in helical paths longitudinally of vessel 2 and center pipe 20. The bottom end of trough 28 discharges through an opening in the side wall of vessel 2 into a drain pipe 34 which is attached to the vessel and preferably intersects it at an acute angle as shown in FIG. 3 to promote rapid discharge of liquid from the trough. The bottom end of the trough is terminated by an end wall 36 (FIG. 3) and may be covered by a plate 38 (FIG. 4) so as to make certain that all of the liquid collecting in the trough will be directed into drain pipe 34.

Figure 4:
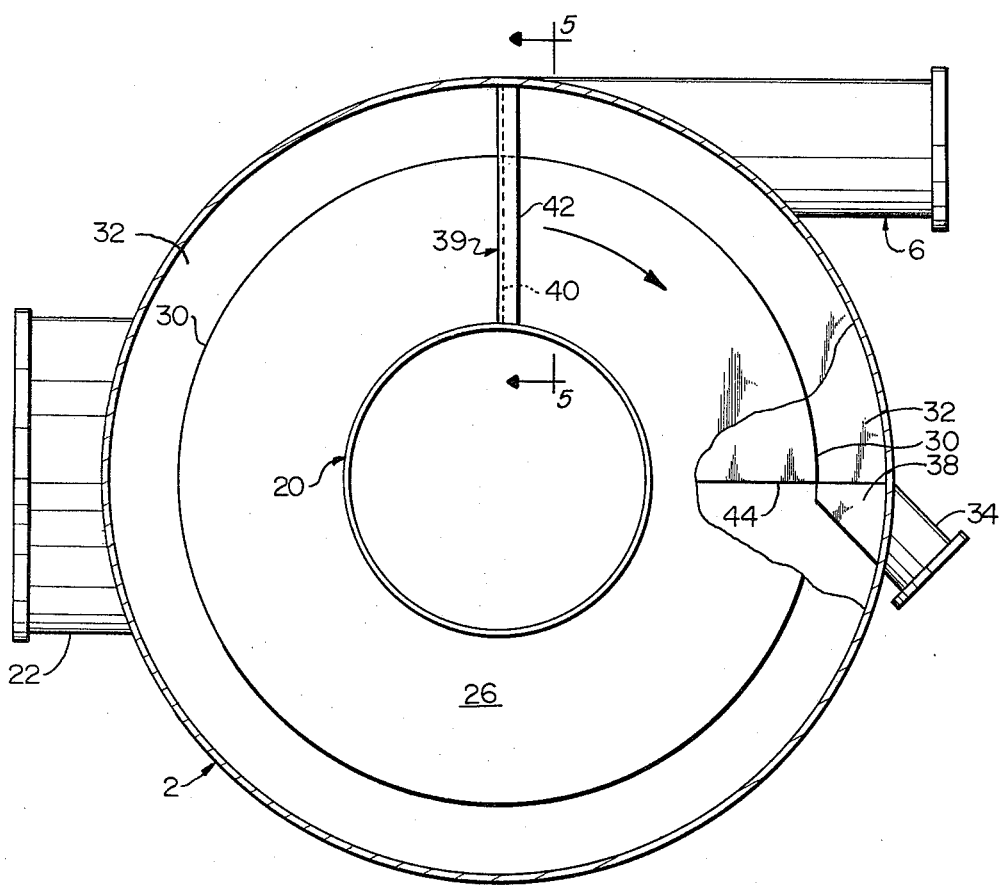
FIG. 4 is a cross-sectional view taken along line 4—4 of FIG. 2.
Figure 5:
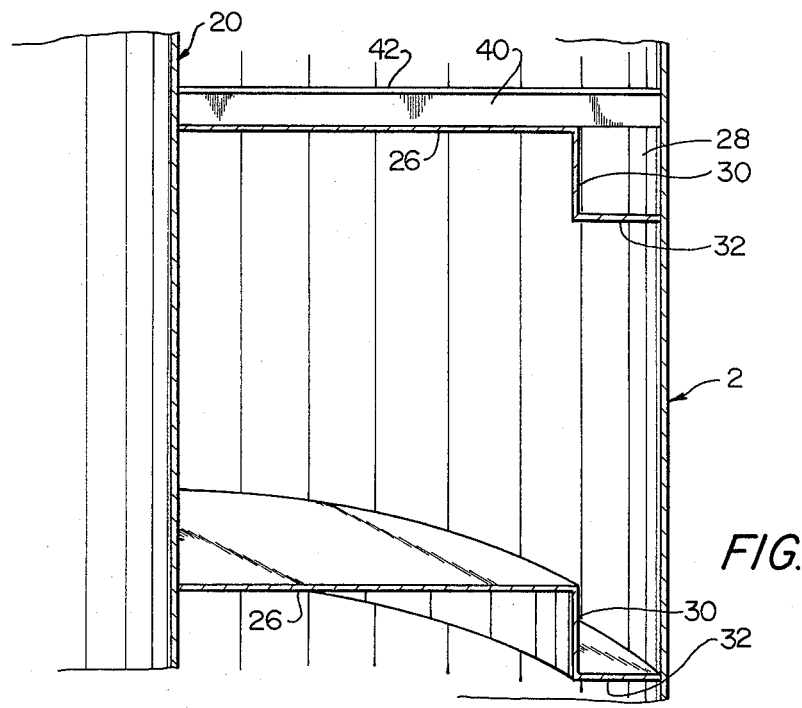
FIG. 5 is a sectional view taken along line 5—5 of FIG. 4 showing details of the spin plate.

Referring now to FIGS. 4 and 5, the upper end of spin plate 26 terminates in an entrainment catcher 39 in the form of a vertical wall 40 with an integral flange 42 at its top end. Vertical wall 40 is integral with spin plate 26 and is welded to center pipe 20 and the inner surface of vessel 2. The height of the separator and the number of turns of spin plate 26 are set according to the length of the helical path required for the vapor to discharge the entrainment. Thus while spin plate 26 may be formed so that it makes two or more turns around center pipe 20, it has been found that it may function satisfactorily if it makes less than two turns provided its upper end edge overlaps its lower end edge 44 (FIG. 4) by an amount sufficient to assure that a tunnel-like opening is formed between the lower end of the spin plate and the vertically spaced overlapping portion of the spin plate. In the illustrated unit the spin makes about one and one quarter turns, overlapping itself by about 90°.

A second entrainment catcher 45 (FIG. 1) is provided on the inner surface of vessel 2 just below the level of the open upper end of center pipe 20. Preferably as shown in FIG. 2 this second catcher comprises a horizontal annular wall 46 with an integral depending flange 48 at its inner edge.

Apparatus as above described may be made in various sizes but is particularly suitable for large volume applications. By way of example but not limitation, in a vessel 2 having an height of aproximately 45 feet from its bottom outlet 8 to its upper end wall 25 and a maximum diameter of about 12 feet, the center pipe 20 has an outside diameter of approximately 4 feet, the width and depth of trough 28 are each about 12 inches, the spin plate 26 makes 1¼ turns and has a vertical spacing of about 3 feet, 9 inches between its overlapping portions, and catchers 39 and 45 are each made of 3"×3"×¼ angle iron.

FIG. 6 illustrates how the evaporator may be used in a system for concentrating a liquid. The bottom outlet 8 of vessel 2 is connected by downleg pipe 10, a pump 50 and a suitable heat exchanger 52 to inlet pipe 6, and makeup liquid to be concentrated is introduced to inlet pipe 6 by a fresh feed pipe 50. In this connection it is to be noted that the liquid to be concentrated in the evaporator (i.e., the liquid introduced by inlet pipe 6), is required to be heated to a predetermined temperature in order for flash evaporation to be achieved. Whatever additional heat input is required is provided by heat exchanger 52 which is heated by steam or other heating fluid. While an exterior heat exchanger is preferred, exchanger 52 could be replaced by a heat exchanger mounted within vessel 2 (as has been done in prior art evaporators) without adversely affecting operation of the above-described entrainment separator. Preferably but not necessarily heat exchanger 52 is a shell and tube type unit, having an inlet port 54 for introduction of steam and an outlet port 55 for withdrawal of the same steam and its condensate.

The vapor outlet end 24 of center pipe 20 is connected to a barometric condenser 58. The latter is a counter-current direct contact type condenser, of the type described in Perry's Chemical Engineers' Handbook, Fourth Edition, pp. 11–40, McGraw-Hill (1963), having a vapor inlet 60 connected to center pipe 20, a vapor outlet 62, a water inlet 64, and a water outlet 66. Vapor outlet 62 is connected to a vacuum pump which preferably is in the form of a steam-jet ejector (not shown) which serves as a vacuum source as well as a means for exhausting non-condensible gases from the system. Condenser 58 is mounted so that its water outlet 66 is located sufficiently high so that water can discharge by gravity from the vacuum established in the condenser. More specifically, the condenser is located so that its water outlet is at a height sufficient to maintain the necessary vacuum in the condenser and evaporator, according to well-established practice.

Operation of the system of FIG. 6 will now be described in connection with an example of its use in concentrating aqueous phosphoric acid. In this example it is assumed that vessel 2 is the first stage of a two stage evaporation system. In a typical 2-stage evaporation system for phosphoric acid, the first stage phosphoric acid feed has a $P_2O_5$ concentration of about 25 wt. % or greater, the desired product output of the first stage is about 40 wt. % $P_2O_5$ phosphoric acid, and the desired product output of the second stage is about 54 wt. % $P_2O_5$ phosphoric acid. Accordingly a crude phosphoric acid from a phosphoric acid plant, i.e., the acid product recovered from the reactor(s) in a wet phosphoric acid manufacturing process and filtered to remove gypsum (see wet phosphoric acid manufacturing process described in U.S. Pat. Nos. 3,231,331 and 4,044,107) is introduced into the system via feed pipe 50 and fed, together with recycle phosphoric acid liquid supplied by pump 53, to inlet pipe 6 at a temperature of between about 185° and 200° F. The acid recycled by pump 53 is heated up 8-10 Fahrenheit degrees in exchanger 52. A reduced pressure of about 22 inches of mercury is maintained in flashing chamber 19 via center pipe 20, condenser 58 and the steam ejector vacuum source (not shown). Aqueous phosphoric acid filtrate is introduced continuously via feed pipe 50 at a $P_2O_5$ value of between about 28 to 32 wt. %, and acid is recovered continuously via line 13 at a concentration of about 40% $P_2O_5$.

The liquid acid introduced via line 6 substantially tangentially of vessel 2 causes a swirling action in the liquid above plates 12 and 14. The reduced pressure in vessel 2 causes flash vaporization of water in flashing chamber 19. Droplets of phosphoric acid are entrained in the water vapor. The vapor phase in chamber 19 also may include non-condensible gases such as air and fluorine compounds formed as by-products in the wet phosphoric acid manufacturing process. The vapor with the entrained droplets of phosphoric acid enters the separator section via the relatively large separator inlet (the opening formed between the lower end edge 44 of spin plate 26 and the portion of the spin plate which is located directly above end edge 44) and follows a helical path as it moves rapidly over the upper surface of the spin plate around center pipe 20. The vapor moves through the separator at a high velocity in a cyclone-type action, producing a centrifugal force on the entrained droplets which causes them to be thrown radially toward trough 28 and the inner surface of vessel 2 and thereby separated from the cyclonically moving vapor which reverses direction on reaching the upper end of the evaporator vessel and moves down into the upper end of center pipe 20. The vapor is discharged from the evaporator and enters barometric condenser 58 under the suction effect of the vacuum maintained by that condenser and the steam jet-type vacuum pump (not shown). Cool water supplied to condenser 58 at its inlet 64 condenses the flashed water vapor. The condensed water vapor and the water supplied at inlet 64 are discharged at outlet 66. Non-condensible gases in the vapor discharged from the evaporator are sucked out of the condenser at its outlet 62 and are discharged to the atmosphere directly or after further treatment according to governmental emissions requirements.

Depending on the velocity of the vapor, some droplets also may deposit on the upper surface of spin plate 26 under the influence of gravity. Any tendency of separated droplets collecting on spin plate 26 or the inner surface of vessel 2 to move upwardly as a film in the manner characteristic of "climbing film" evaporators (see U.S. Pat. No. 940,473) is frustrated by catchers 39 and 45. As a consequence liquid acid collecting on spin plate 26 or the inner surface of vessel 2 tends to drop by gravity into trough 28 or back into the flashing chamber instead of being allowed to move up to the level of the inlet end of center pipe 20, with the result that the entrainment separated by the cyclonic action cannot recombine with the vapor as the latter reaches the upper inlet end of pipe 20. The acid collecting in trough 28 is returned to the evaporation system. In this case the acid in trough 28 is passed by a line 68 to a side port 69 in downleg 10. The latter continuously removes liquid from below the liquid level 17 and passes it back to inlet pipe 6 via pump 53 for further evaporation.

Referring again to FIG. 2 the entrainment separator may be modified by replacing drain pipe 34 and the side opening which connects it to trough 28 by an internal entrainment drain in the form of a vertically-extending dipleg (not shown) which has its upper end connected to a drain hole in the bottom wall 32 of the trough, while its lower end extends down far enough in vessel 2 to always be submerged in the pool of liquid being evaporated.

Figure 7:
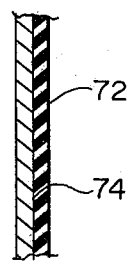
FIG. 7 is a sectional view illustrating a structural feature of the invention.

Obviously the apparatus described above must be capable of withstanding attack by the material being concentrated. In the case of concentrating phosphoric acid, the apparatus and connecting pipe lines may be constructed of a carbon steel if, as shown in FIG. 7, a rubber coating 72 is attached to each carbon steel surface 74 which will be contacted by the acid or the vapor flashed from the acid. In the case of center pipe 20, both its inner and outer surfaces must be rubber coated; similarly, a rubber coating must be applied to all surfaces of spin plate 26 and the trough-defining walls 30 and 32. The rubber coating is attached by a suitable bonding agent known to persons skilled in the art. Of course, the need to line the metal surfaces with rubber may be avoided by making the above-described apparatus of an alloy which is resistant to the liquid being concentrated and the vapor which is evaporated from the liquid. However, carbon steel lined with rubber is preferred for processing phosphoric acid since those materials are relatively low in cost.

There are a number of advantages to an evaporator system with an entrainment separator made in accordance with this invention. For one thing, the possibility of re-entrainment of liquid in the vapor as the vapor leaves the separator is almost non-existent, in part due to the catchers 39 and 45 but mostly due to the fact that the vapor rising along the separator must reverse its direction of movement in order to proceed from the separator into the inlet end of center pipe 20. A further advantage is that the cyclonic action is vigorous, producing a centrifugal force which is sufficiently large to rapidly cause the entrained liquid droplets to separate from the vapor. Still another advantage is that the separator can be scaled up or down in size according to the size of the evaporator vessel without having to change its basic design. If desired the section of the vessel 2 containing the separator may be made smaller in diameter than the portion of the vessel immediately below the separator. Another important advantage is that an evaporator made with a separator according to this invention is relatively cheap to fabricate in comparison with other evaporators used to concentrate phosphoric acid, due in part to the fact that the helical separator is formed in part by the wall of vessel 2 instead of requiring a separate vessel for itself or necessitating an added pressure-resistant wall or bulkhead. The separator members 26, 30 and 32 may be made of relatively thin metal plate since they need not be as strong as the side, top and bottom walls of vessel 2 or center pipe 20.

A further advantage of the invention is that the pressure drop across the entrainment separator is relatively small, typically in the order of $6\frac{1}{2}$-7 inches of water. Also contributing to efficient coupling of the evaporator to the vacuum pump is the avoidance of external piping between the evaporator flashing chamber and the entrainment separator, as is required in certain known prior evaporators used to concentrate phosphoric acid. A further advantage is achieved with the center pipe 20. In certain prior designs the vapor is discharged from the entrainment separator via a top exit port, thus necessitating a greater piping cost than with the present invention since the barometric condenser must be located below the top end of the evaporator vessel. In this connection it is to be appreciated that the vapor velocity in the entrainment separator is related to the pressure differential across the separator, and shorter pipe lines mean lower pressure drop losses. Hence shortening the line connecting the separator to the barometric condenser makes it possible to utilize more of the pressure differential between inlet pipe 6 and condenser 58 in the separator so as to maximize the separator flow velocity and hence improve the entrainment separation. Another noteworthy advantage of the separator is that it is easy to clean. In this connection it is to be noted that man-ways as shown, for example, at 80 and 82 may be provided to permit access to the separator and flashing chamber. Additionally cleaning of the separator as well as the remainder of the evaporator may be facilitated by filling the entire vessel 2 with pond water introduced and removed via ports (not shown) located at its upper and lower ends. That mode of cleaning the entrainment separator is not easily accomplished with certain prior separator designs.

Other advantages and possible modifications will be obvious to persons skilled in the art from the foregoing description and the accompanying drawings.

What is claimed is:

1. In an evaporating apparatus comprising a vessel constructed to contain a pool of vaporizable liquid in the lower part thereof and having a side inlet for supplying make-up liquid to said pool, (b) a first connection for withdrawing liquid from the bottom of said pool and returning it to said pool via said side inlet, (c) a second connection for withdrawing liquid from said pool and passing it to storage or a second evaporator apparatus, and (d) a closed upper end, an entrainment separator comprising (a) a vapor exhaust pipe having a first open upper end within said vessel for receiving vapor evaporated from said pool and a second lower end communicating outside of said vessel, (b) means defining a helical path for conducting vapor evaporated from said pool to said first upper end of said vapor exhaust pipe and separating entrained liquid from said vapor by centrifugal action, and (c) means defining a trough for collecting liquid separated from said vapor.

2. Apparatus according to claim 1 wherein said vapor exhaust pipe comprises a vertically-extending leg terminating in said first open upper end and a laterally-extending leg terminating in said second lower end, and said helical path extends around said vertical leg.

3. Apparatus according to claim 1 wherein said means defining a helical path comprises a helical plate which extends around a portion of said vapor exhaust pipe.

4. Apparatus according to claim 3 wherein said means defining a trough for collecting liquid separated from said vapor is integral with said helical plate.

5. Apparatus according to claim 1 wherein said means defining a trough comprises a first helical wall attached to said helical plate and a second helical wall extending between and connected to said first helical wall and an internal surface of said vessel.

6. Apparatus according to claim 5 wherein said helical plate has a first lower end and a second upper end, and further wherein said second upper end terminates at a level which does not exceed the level of said first open upper end of said vapor exhaust pipe.

7. Apparatus according to claim 6 wherein said second upper end of said helical plate overlaps said first lower end of said helical plate.

8. Apparatus according to claim 6 wherein said helical plate extends through more than one turn about said vapor exhaust pipe.

9. Apparatus according to claim 8 wherein said helical plate makes approximately $1\frac{1}{4}$ turns about said vapor exhaust pipe.

10. Apparatus according to claim 5 wherein said helical plate and said first and second helical walls extend fully around the space between said exhaust pipe and said internal surface.

11. Apparatus according to claim 10 wherein said helical plate has upper and lower ends, and further including entrainment catcher means at said upper and lower ends of said helical plate.

12. Apparatus according to claim 1 further including means for removing liquid from said trough and reintroducing said removed liquid to said pool of vaporizable liquid.

13. Apparatus according to claim 12 wherein said last-mentioned means comprises a pipe located within said vessel and extending down from said trough to said pool of vaporizable liquid.

14. Apparatus according to claim 1 wherein said first connection comprises a pipe connected at one end to said side inlet and at the other end to an outlet at the bottom of said vessel, and further including means for removing liquid from said trough and re-introducing said removed liquid to said pool of vaporizable liquid via said pipe.

15. Apparatus according to claim 1 wherein said vapor exhaust pipe has a first vertical section centrally located in said vessel and terminating in said first open upper end, and a second laterally extending section communicating with a side opening in said vessel above said pool of liquid, said means defining a helical path for vapor comprises a helical spin plate extending around said first vertical section, and said trough extends around the periphery of said spin plate.

16. Apparatus according to claim 15 wherein said trough extends for substantially the full circumferential length of said spin plate.

17. Apparatus according to claim 16 wherein said trough is defined by structure attached at its inner side to said spin plate and at its outer side to said vessel.

18. Apparatus according to claim 1 wherein said second lower end of said vapor exhaust pipe is connected to a barometric condenser.

19. Apparatus according to claim 18 wherein a substantial pressure drop exists between said inlet for makeup liquid and the second end of said vapor exhaust pipe.

20. Apparatus according to claim 19 wherein a vacuum pump is connected to said barometric condenser.

21. Apparatus according to claim 18 wherein said first connection comprises (a) a bottom discharge port at the bottom end of said vessel, (b) a recycle pipe connecting said bottom discharge port to said make-up liquid inlet, and (c) a pump for causing liquid to flow from said bottom discharge port to said liquid inlet.

22. Apparatus according to claim 21 further including means for supplying heat to liquid flowing in said recycle pipe.

23. Apparatus according to claim 22 wherein said barometric condenser is located below the upper end of said vessel.

24. Apparatus according to claim 1 wherein said vapor exhaust pipe is coated with rubber.

* * * * *

UNITED STATES PATENT AND TRADEMARK OFFICE
CERTIFICATE OF CORRECTION

PATENT NO. : 4375386
DATED : March 1, 1983
INVENTOR(S) : Donald Windham

It is certified that error appears in the above-identified patent and that said Letters Patent are hereby corrected as shown below:

Claim 1, column 7, line 32, "(a)" should be inserted after the word -- having --.

Claim 1, column 7, line 38, the word "and" (second occurrence), should be -- end --.

Signed and Sealed this

Twenty-fourth Day of May 1983

[SEAL]

Attest:

DONALD J. QUIGG

Attesting Officer      Acting Commissioner of Patents and Trademarks